United States Patent [19]

Miwa et al.

[11] 4,070,164

[45] Jan. 24, 1978

[54] ADSORPTION-DESORPTION PRESSURE SWING GAS SEPARATION

[75] Inventors: Kishio Miwa; Kazuo Tsunoi, both of Kamakura; Yoshio Noguchi, Chita, all of Japan

[73] Assignee: Toray Industries, Inc., Tokyo, Japan

[21] Appl. No.: 704,958

[22] Filed: July 13, 1976

[30] Foreign Application Priority Data

Feb. 18, 1976  Japan .................................. 51-15762

[51] Int. Cl.² ............................................ B01D 53/04
[52] U.S. Cl. .......................................... 55/26; 55/33; 55/58; 55/62; 55/75
[58] Field of Search ................... 55/25, 26, 33, 58, 62, 55/74, 75, 387, 389

[56] References Cited

U.S. PATENT DOCUMENTS

| | | | |
|---|---|---|---|
| 3,533,221 | 10/1970 | Tamura | 55/33 |
| 3,564,816 | 2/1971 | Batta | 55/62 X |
| 3,717,974 | 2/1973 | Batta | 55/62 X |
| 3,720,042 | 3/1973 | Simonet | 55/25 |
| 3,788,037 | 1/1974 | Shell et al. | 55/58 |

Primary Examiner—John Adee
Assistant Examiner—Robert H. Spitzer
Attorney, Agent, or Firm—Miller & Prestia

[57] ABSTRACT

Pressure swing selective adsorption-desorption process and apparatus for separating at least one gaseous component from a gas mixture.

After selective adsorption from the gas mixture, the subsequent desorption procedure comprises two separate steps which are carried out under different pressures. The desorbed gases obtained by the two separate desorption steps are then combined.

16 Claims, 7 Drawing Figures

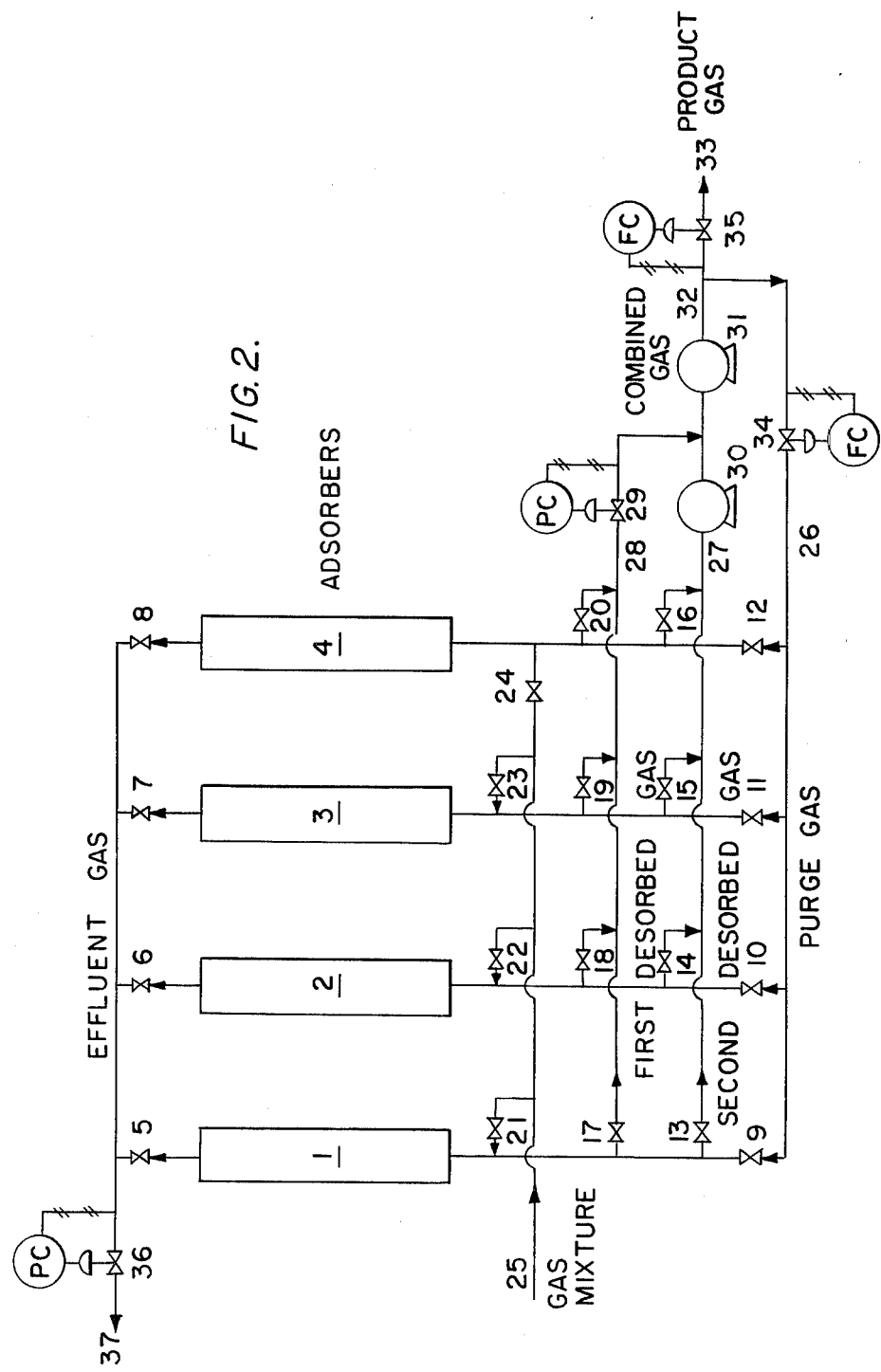

ADSORPTION-DESORPTION PRESSURE SWING GAS SEPARATION

BACKGROUND OF THE INVENTION

1. Field of the Invention

The present invention relates to a new pressure swing adsorption process, and to apparatus for separating at least one gas component from a gas mixture, such a separation of nitrogen and oxygen from air, for example. More particularly, the invention relates to an improved desorption procedure, and to an apparatus for practicing it.

Still further, the invention relates to an improved pressure swing desorption procedure and to an apparatus suitable for carrying it into effect for recovering or collecting at least one selectively adsorbable gas component, at a substantially constant flow rate, from a gas mixture.

2. Description of the Prior Art

Pressure swing adsorption processes for separating gas mixtures having selectively adsorbable components are well known (for example, reference is made to Japanese Pat. publication 25069/1963). These processes consist, as fundamental steps, of (1) an adsorption step conducted at a relatively high pressure and (2) a desorption step conducted with pressure reduction. In industrial processes, however, it is the general practice that at least one additional step is combined with the fundamental steps (1) and (2) for recovering a selectively adsorbable component economically. The additional operation step may also be used to recover a less selectively adsorbable component from the gas mixture, in satisfactory yield and in a pure state.

Various improvement attempts have been made relating to these and other additional steps. When it is desired to recover a selectively adsorbable gas component in high purity, for example, purging with a pure gas of the selectively adsorbable gas component may be practiced prior to the desorption step (reference is made, for example, to U.S. Pat. No. 3,797,201).

It is also important to recover a gas which is enriched with at least one selectively adsorbable gas component at a constant flow rate. This is particularly true when the gas is utilized for other industrial purposes.

OBJECTS OF THE INVENTION

It is an object of this invention to provide an improved pressure swing adsorption process for separation of a gas from a mixture containing the gas, and for effectively recovering a gas enriched with at least one selectively adsorbable gas component, all at a substantially constant flow rate and/or pressure.

Another object is to provide an apparatus suitable for practicing the process. Other objects and advantages of the invention will appear in future detail hereinafter.

BRIEF DESCRIPTION OF THE INVENTION

This invention relates to a process for separating an adsorbable gas component from less readily absorbable components of a gas mixture, by means of a pressure swing adsorption technique including an adsorption step accompanied by pressure elevation, and also including a desorption step accompanied by pressure reduction. The process is conveniently performed by using adsorption columns packed with an adsorbent having capacity to adsorb the more adsorbable gas component selectively. This invention particularly relates to an improvement in which:

a. the desorption step is divided into two steps which are carried out in separate adsorption columns concurrently;

b. a first desorbed gas is caused to flow from an initial region of relatively high pressure to a subsequent region at an intermediate pressure, while a second desorbed gas is conducted under lower pressure by pressure reduction from a region at said intermediate pressure to a region at a lower final pressure;

c. said second desorbed gas is combined with a portion or with all of said first desorbed gas; and d. the flow rate of the resulting combined gas is adjusted so that the combined gas thus obtained is produced at a substantially constant flow rate.

The process of this invention may suitably the conducted in an apparatus comprising:

a. at least three adsorption columns connected through conduits to several manifolds, which manifolds include at least (1) a gas mixture manifold, (2) a first desorbed gas manifold, (3) a second desorbed gas manifold and (4) an effluent gas manifold;

b. said first and second desorbed gas manifolds (2) and (3) being connected to each other to form a combined gas conduit; and c. said first desorbed gas manifold (2) having a control valve therein for adjusting the flow rate of the first desorbed gas, so as to keep the flow rate of the resulting combined gas substantially constant.

DETAILED DESCRIPTION

The foregoing apparatus and process features will further become apparent by reference to specific embodiments of the invention.

In the drawings:

FIG. 2 is a schematic flowsheet of an apparatus suitable for practicing the present invention;

Figure 1:
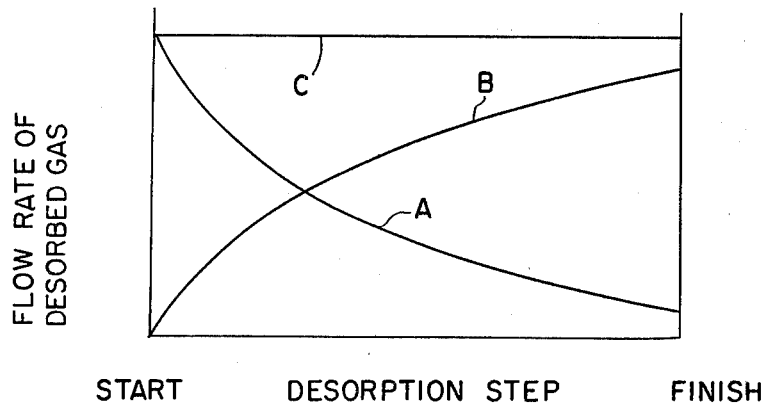
FIG. 1 is a chart showing the changes of flow rate of a first desorbed gas (B), a second desorbed gas (A) and combined gases (C) during a desorption step in accordance with one embodiment of this invention.

At this point, certain specific embodiments of this invention will be explained, having reference to the drawings. However, it is to be understood that the scope of the invention is not intended to be restricted to these specific forms, or by the specific terms of the specification which relate to those forms.

FIG. 2 of the drawings is a schematic flowsheet of an apparatus which is suitable for continuously recovering a gas containing at least one selectively adsorbable gas component in relatively high concentration. In the drawings the legend "PC" means a pressure controller, which may be of any type well known per se. The legend "FC" means a flow controller. Adsorption columns 1, 2, 3 and 4 are packed with an adsorbent which adsorbs the selectively adsorbable gas component. A gas mixture, the pressure of which has been previously raised to a pressure higher than atmospheric pressure, is introduced through a gas mixture manifold 25 to an adsorption column 1 in which the second desorption step has already been completed. The adsorption step is now conducted in column 1. During this step, valve 21 is open and valves 5, 9, 13 and 17 are closed. To column 2 in which the adsorption step has finished, a purge gas is introduced through purge gas manifold 26 and valve 10, while an effluent gas enriched with at least one less selectively adsorbable gas component is discharged through the valve 6 and the effluent gas manifold 37 (purge step). During the purge step, valves 10 and 6 are open and valves 14, 18 and 22 are closed. The pressure in column 2 is kept the same as the final pressure of the adsorption step by means of a control valve 36 which controls the pressure of the effluent gas. A first desorbed gas containing at least one selectively adsorbable gas component in high concentration is withdrawn from column 3 by pressure release through a first desorbed gas manifold 28 after the purge step in column 3 has been completed (first desorption step). During this step, valve 19 is opened and valves 7, 11, 15 and 23 are closed.

A second desorbed gas also containing at least one selectively adsorbable gas component in high concentration is withdrawn from column 4 by a vacuum compressor 30 through second desorbed gas manifold 27. At this stage, the first desorption step has been completed in column 4. This, accordingly, may be referred to as the second desorption step. During this step, valve 16 is open and valves 8, 12, 20 and 24 are closed.

The pressure of the second desorbed gas after being compressed by compressor 30 is the same as the pressure of the first desorbed gas at the outlet of pressure control valve 29. Then, both desorbed gases are combined and the combined gas thus obtained is passed through the combined gas conduit 32. The combined gas is compressed by a compressor 31 installed in the conduit 32, and the pressure of the combined gas is increased to the pressure of the purge gas, or even higher. Subsequently, a portion of the combined gas is recovered as product gas through product gas conduit 33 and the rest is recycled to purge gas manifold 26 for use as purge gas. Although the uncontrolled flow rate of the second desorbed gas gradually decreases with reduction of pressure in column 4, the pressure of the combined gas is kept substantially constant by gradually increasing the flow rate of the first desorbed gas which is controlled by control valve 29. That is, since the flow rates of the product gas and the purge gas are kept constant by the flow control valves 35 and 34, respectively, the combined gas can be caused to flow at a constant flow rate by adjusting the flow rate of the first desorbed gas with pressure control valve 29 so as to keep the pressure of the combined gas constant.

In the next operation stage, the adsorption, purge, first desorption and second desorption steps are conducted in columns 4, 1, 2 and 3 respectively. In this way, the steps of the operation are consecutively repeated through predetermined periods of time. Thus, the product gas may be collected continuously at a constant flow rate and at a constant pressure.

The ratio of the amount of the second desorbed gas to that of the first desorbed gas may be controlled as desired. It is, however, preferably less than unity. Particularly, when the amount of second desorbed gas is too large as compared to the amount of the first desorbed gas, it becomes essentially impossible to keep the flow rate of the combined gas constant in the apparatus illustrated in FIG. 2.

Figure 3:
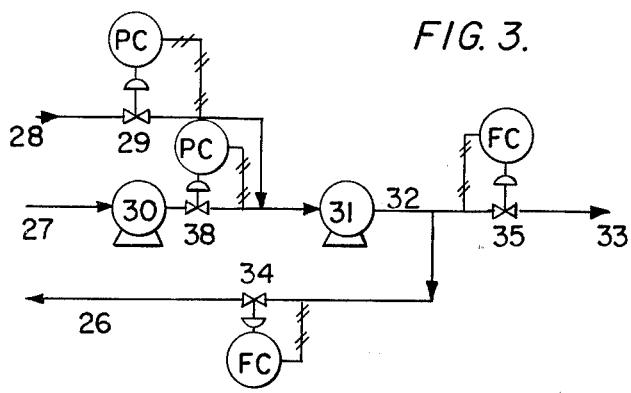
FIGS. 3 to 6 are modifications of the flowsheet of FIG. 2.

FIG. 3 is a modified flowsheet which is suitable for the situation wherein the amount of the second desorbed gas is extremely large as compared to that of the first desorbed gas. In this case, an additional control valve 38 is provided downstream of compressor 30 so that the flow rate of the second desorbed gas may also be controlled. Pressure control valve 38 is set at a pressure which is slightly higher than that of pressure control valve 29.

Figure 4:
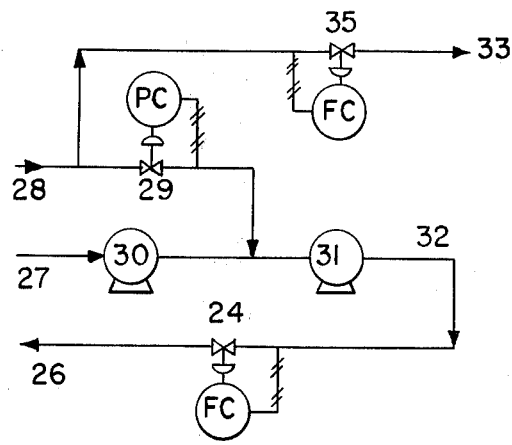

In a modified embodiment of this invention as illustrated in FIG. 4, a portion of the first desorbed gas is directly recovered as product gas from the product gas conduit 33 which is connected to the first desorbed gas manifold 28. The remainder of the first desorbed gas is combined with the second desorbed gas, to be used as the purge gas in this embodiment, and may be so used when the amount of the first desorbed gas is sufficiently large as compared to the amount of the second desorbed gas.

Figure 5:
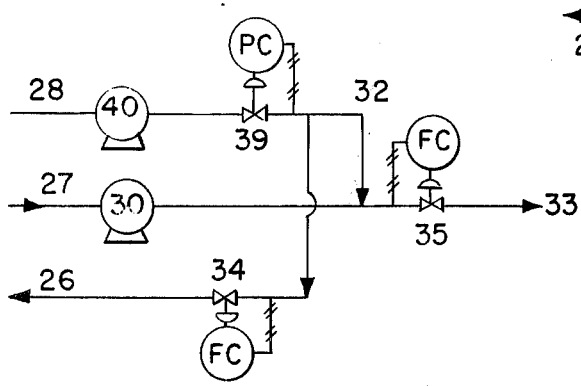

In FIG. 5, the first and second desorbed gases are individually compressed with the use of compressors 40 and 30, respectively. Then the first desorbed gas is preferentially used as a purge gas and the second desorbed gas is preferentially recovered as the product gas.

Figure 6:
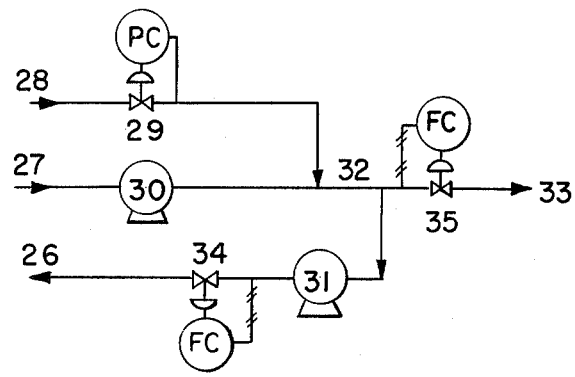

FIG. 6 shows another modified embodiment suitable for the situation wherein the pressure of the product gas is not desired or required to be very high. In this case, compressor 31 is provided at purge gas manifold 26 and is used only for compression of the purge gas.

When a portion of the effluent gas is utilized together with the gas mixture for the adsorption step, a branch is provided in the effluent gas manifold and its other end is connected to the gas mixture manifold.

One of the preferred applications of this invention resides in the separation of nitrogen from air.

It is well known that zeolites adsorb nitrogen selectively with respect to oxygen [for example, reference is made to R. M. Barrer, Proc. Roy. Soc., (London) A167, 382 (1938)]. Therefore, the nitrogen and oxygen contained in air can be separated using zeolites as adsorbents in accordance with this invention.

In the use of zeolites for separating oxygen and nitrogen in a gas mixture, the more easily absorbable and the less easily adsorbable gas components mean nitrogen and oxygen, respectively. Various zeolites, such as for example zeolites A, X and Y, mordenite and clinoptirolite may preferably be employed in nitrogen oxygen-separation according to this invention. They may be synthetic or natural. Furthermore, a single zeolite may be used or, if necessary, a combination of two or more kinds of zeolites is also effective.

Although the pressure conditions of the operation steps are chosen adequately for separation of nitrogen and oxygen from air, the end pressure of the adsorption step, the initial pressure of the first desorption step and the pressure of the purge step preferably lie between about 0.5 and 7 $kg/cm^2$ gauge. The final pressures of the first and second desorption step are preferably between about 500 torr and 2 $kg/cm^2$ gauge, and between about 50 and 700 torr, respectively.

Air also contains carbon dioxide and moisture in minor amounts. Therefore, when such air is employed in the process of this invention, the desorbed gas which is enriched with nitrogen also contains such carbon dioxide and moisture, because they are also selectively adsorbable by the zeolites.

If it is desired that the desorbed gas be substantially free of carbon dioxide and/or moisture, the air is previously treated to remove at least one of these components. The pre-treatment is preferably conducted in guard chambers packed with an adsorbent which adsorbs at least one of these components. Preferably, two such guard chambers are provided. Air is introduced into one of the guard chambers, and moisture and/or carbon dioxide are removed by adsorption (hereinafter, this step is called the removal step). At the same time, a desorbent gas is introduced into the other chamber in which the removal step has already been finished, so that moisture and/or carbon dioxide adsorbed on the adsorbent are released (hereinafter this step is called the regeneration step).

By alternately repeating the removal and regeneration steps, a pre-treated air is continuously obtained which is substantially free of moisture and/or carbon dioxide. The removal step is preferably conducted at a pressure between about 1 and 7 $kg/cm^2$ gauge, while the pressure of the regeneration step is preferably about equal to atmospheric pressure.

The desorbent gas is preferably substantially free of moisture and/or carbon dioxide and particularly the effluent gas enriched with oxygen discharged from the nitrogen-oxygen separation process by this invention.

Figure 7:
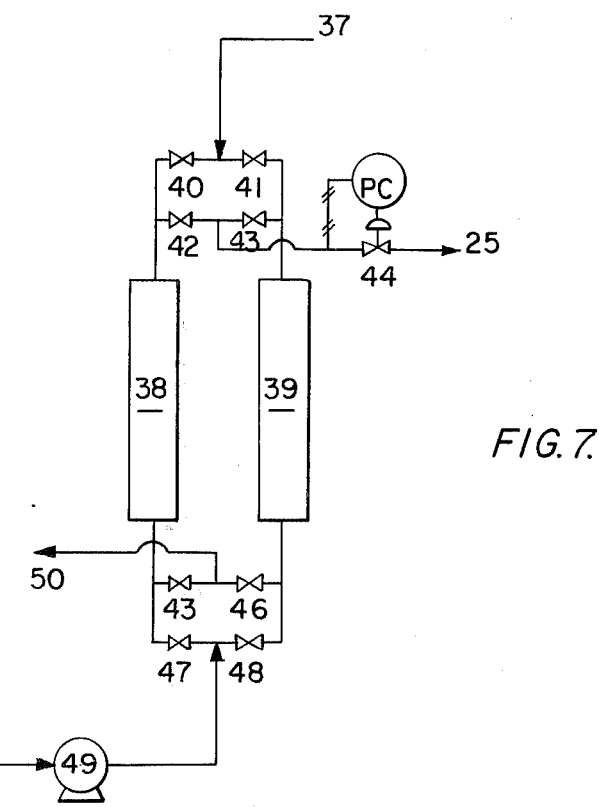
FIG. 7 is a schematic flowsheet of an apparatus suitable for practicing the pretreatment of air.

FIG. 7 illustrates an apparatus suitable for practicing the pretreatment of air. Two guard chambers 38 and 39 are provided, containing adsorbents which adsorb moisture and/or carbon dioxide. They are connected to four conduits for introducing air 51, discharging a waste gas 50, withdrawing treated air 25 (corresponding to the gas mixture manifold in FIG. 2) and introducing a desorbent gas 37 (corresponding to the effluent gas manifold in FIG. 2). Preferably, as shown in FIG. 7, one end of each guard chamber is connected to two conduits for introducing air and for discharging a waste gas and the other end to the other two conduits. And then, the other end of the conduit for withdrawing treated air is connected to the above mentioned gas mixture manifold of the apparatus. Furthermore, when the effluent gas is used as the desorbent gas, the conduit for introducing the desorbent gas is connected to the effluent gas manifold.

Well known materials may be used to adsorb moisture and/or carbon dioxide. For example, silica gel, alumina and zeolites are suitable for moisture removal, and zeolites for carbon dioxide removal. These materials may be used individually or in combinations of two or more materials.

An embodiment of this invention will be explained by reference to the following example, which relates to the separation of nitrogen from air.

Accordingly, it will be appreciated that in accordance with a preferred embodiment of this invention, a gas mixture is introduced through a gas mixture manifold to an adsorption column containing an adsorbent which adsorbs at least one selectively adsorbable gas component from the gas mixture, in which a second desorption step as will be explained below has already been completed (adsorption step).

During this step the bed pressure is increased to a higher pressure (the final pressure of the adsorption step) and at least one selectively adsorbable gas component is adsorbed on the adsorbent. After the final pressure of this step is reached, a gas which is enriched with at least one less selectively adsorbable gas component is discharged through an effluent gas manifold a conventional method such as, for example, a slight reduction of the pressure, a release by additional feeding of the gas mixture, or a purge with a gas enriched with the selectively adsorbable gas component, etc. In the next stage, a gas remaining in the adsorption column and being enriched with at least one selectively adsorbable gas component, is desorbed. First, a first desorbed gas having a relatively high pressure is recovered through a first desorbed gas manifold by reducing the pressure to an intermediate pressure (first desorption step). The initial pressure of the first desorption step is equal to or slightly lower than the final pressure of the adsorption step. At the same time, a second desorbed gas having a lower pressure is recovered from another desorption bed in which the first desorption step has already been completed, through a second desorbed gas manifold. This is carried into effect by reducing the pressure from the intermediate pressure corresponding to the final pressure of the first desorption step to the final (lowest) pressure of the process (second desorption step). Then the second desorbed gas is combined with a portion, or with all of the first desorbed gas, and the combined gas thus obtained is recovered through a combined gas conduit. In order to recover the combined gas at a substantially constant flow rate and/or pressure, the flow rate of the first desorbed gas to be combined is adjusted by use of a control valve located at the first desorbed gas manifold, so that the combined gas is recovered at a substantially constant flow rate.

The process of this invention may be conducted in combination with the other operations already known, such as purging by introducing a pure gas, for separating at least one gas component from the gas mixture in a satisfactory yield, in a high state of purity and with high efficiency. In these cases, additional equipment may be added to the apparatus.

It will now be apparent that this invention relates to provisions of an improved desorption procedure, and an apparatus suitable for doing so, in a pressure swing adsorption process.

Previously proposed desorption procedures comprise simple pressure reduction (for example, Japanese Pat. application 26246/1965). Hereinafter, such a simple desorption procedure is called a one-step desorption procedure. No attempt has been proposed relating to improvement of a desorption procedure in a manner to prevent the change of flow rate of the desorbed gas which is necessarily brought out in the desorption step, because the flow rate gradually decreases with decreasing pressure of the column during the step.

One of the conventional means for recovering the desorbed gas at a constant flow rate from such known processes is to provide a surge tank for the desorbed gas. This tank is, however, necessarily of large enough capacity to decrease the change of flow rate of the desorbed gas. This type of apparatus is not only expensive, but it also occupies an undesirable amount of space.

Another means that might be suggested is to provide a control valve for controlling the flow rate of the desorbed gas. Even by this means, however, an extreme decrease cannot be avoided when the pressure drop between inlet and outlet of the said valve becomes much too small. Consequently, a large surge tank as mentioned above is also required, or in the alternative the desorption step must be completed when the pressure of the adsorption column is still considerably higher than that of the desorbed gas that is recovered. Such a situation is also uneconomical, because it means that a smaller quantity of the desorbed gas is recovered.

These disadvantages are completely overcome according to the present invention. Because the flow rate of the desorbed gas (corresponding to the combined gas in this invention) can be kept substantially constant by adjusting the flow rate of the first desorbed gas recovered in the first desorption step although the flow rate of the second desorbed gas changes during the second desorption step. This aspect is shown in FIG. 1 of the drawings.

As shown in FIG. 1, although the uncontrolled flow rate of the second desorbed gas (A) decreases gradually during its desorption step, the flow rate of the combined gas (C) is kept constant by gradually increasing the flow rate of the first desorbed gas (B) which is at the same time recovered from another adsorption column.

This invention is even more advantageous when recovering the desorbed gas (that is, the combined gas) at a higher pressure. In this case, a compressor is provided for connection to the second desorbed gas manifold and, after being compressed, the second desorbed gas is combined with a portion of, or all of, the first desorbed gas. The one-step desorption procedure has further disadvantages in this case.

In the one-step desorption procedure, as the flow rate of the desorbed gas at the outlet of the compressor gradually decreases in proportion to a decrease of the inlet pressure of the compressor during the desorption step, the capacity of the compressor must be designed on a basis of the minimum value of the inlet pressure, at which the flow rate of the desorbed gas is the lowest, in order to provide capacity to recover the desired quantity of the desorbed gas at the desired constant rate. Therefore, the compressor is required to be of very large capacity, and it is correspondingly expensive. To avoid this, a large surge tank of the type mentioned above is also needed, and must be provided before or downstream of the compressor, which is not economical. On the contrary, according to this invention, the flow rate of the second desorbed gas need not be kept constant. This is because, as mentioned above, controlling the flow rate of the first desorbed gas allows the combined gas to be recovered at a substantially constant flow rate. As the capacity of the compressor can be determined on the basis of the average flow rate of the desorbed gas instead of the lowest rate in the above case, a compressor of much smaller capacity can be employed.

The pressure conditions of various steps of the operation in accordance with this invention may be chosen readily. However, the following conditions are preferable for economical recovery of the desorbed gas.

In order to recover an optimum amount of the desorbed gas per given amount of adsorbent, a difference should be established between the initial pressure of the first desorption step and the final pressure of the second desorption step, which is the lowest pressure of the process, which difference is preferred to be as large as possible. On the other hand, adsorption of gases on an adsorbent charge generally obeys the isotherm equations of Langmuir or Freundlich. This means that the dependency of the adsorption capacity on pressure is larger at a lower pressure. Hence, it is more effective to provide a difference of pressure which is as large as possible, and to apply it at a region having a pressure that is as low as possible. Optimum pressures of various operational steps of the present invention depend on the properties of the gases and of the adsorbents employed. Preferably, however, the initial pressure of the first desorption step is higher than atmospheric pressure and the final pressure of the second desorption step, which is the lowest pressure of the process is almost equal to or lower than atmospheric pressure. The final pressure of the first desorption step (that is, the intermediate pressure) lies between these two pressures.

As has been indicated, the process of this invention consists of at least an adsorption step, a first desorption step and a second desorption step. These steps are conducted in separate adsorption columns at the same time, changing, in turn, the columns every given period of time. Thus, a gas enriched with at least one selectively adsorbable gas component is recovered continuously. Therefore, at least three adsorption columns are required for this process. The maximum number of the columns is not limited because, if necessary, one additional operational step may be combined with these steps. Furthermore, the same operational step may be conducted in different columns at the same time.

As will now be apparent, one of the preferable embodiments of this invention allows recovery of a gas containing at least one selectively adsorbable gas component in a relatively high concentration. In this case, prior to the first desorption step, the adsorption bed is purged by a purging gas enriched with at least one selectively adsorbable gas component (purge step).

Thus, adsorption, purge, first desorption and second desorption steps are conducted in separate adsorption columns at the same time, consecutively changing columns in turn. An apparatus suitable for doing this, as heretofore described in detail, comprises at least four adsorption columns consisting of an adsorbent which adsorbs the said selectively adsorbable gas component, a purge gas manifold for introducing the purge gas which is provided. This is in addition to the above-mentioned manifolds (that is, gas mixture, first desorbed gas, second desorbed gas and effluent gas manifold).

The starting gas mixture is introduced through a gas mixture manifold to an adsorption column in which the second desorption step has already been completed. In this adsorption step, the column pressure is increased to the end pressure of the adsorption step, and at least one selectively adsorbable gas component in the gas mixture is adsorbed on the adsorbent.

If necessary, an effluent gas enriched with at least one less selectively adsorbable gas component may be withdrawn through the released gas manifold by feeding an additional amount of the gas mixture, or by reducing the pressure slightly after the final pressure is reached. The next purge step is conducted in order to wash out at least one less selectively adsorbable gas component in the adsorption column with a purge gas enriched with at least one selectively adsorbable gas component. During this purge step, the purge gas is introduced into the column through a purge gas manifold, while the effluent gas which has been enriched with at least one less selectively adsorbable gas component is discharged through the effluent gas manifold. If necessary, a portion of the effluent gas may be utilized together with the gas mixture is the adsorption step. In particular, the effluent gas which is withdrawn in the final stage of the purge step is preferably used for the adsorption step, because it also contains the selectively adsorbable gas component in a relatively high concentration. The pressure of the purge step is preferably almost equal to or slightly lower than the final pressure of the adsorption step, and is generally kept constant during the purge.

In the next stage, the gas remaining in the adsorption column, which contains at least one selectively adsorbable gas component in relatively high concentration, is desorbed. First, in the first desorption step, a first desorbed gas is recovered at a relatively high pressure through a first desorbed gas manifold by reducing the pressure to a final pressure for this step. This pressure may be termed the intermediate pressure. This initial pressure of this step is generally equal to the pressure existing in the purge step, but it is also possible that prior to the first desorption step the column pressure may be slightly relieved. Concurrently, from another adsorption column in which the first desorption step has already finished, a second desorbed gas having a lower pressure is recovered through a second desorbed gas manifold by further reduction of the pressure. The second desorbed gas is, then combined with a portion or all of the first desorbed gas, and the combined gas thus obtained is recovered through a combined gas conduit. At that time, the flow rate of the first desorbed gas to be combined is adjusted with a control valve installed in the first desorbed gas manifold, so that the combined gas is recovered at a substantially constant flow rate.

In the embodiment of the invention just described, the process consists of adsorption, purge, first desorption and second desorption. These four steps are conducted in separate adsorption columns at the same time, consecutively changing the columns in turn during predetermined time periods, so that a gas containing at least one selectively adsorbable gas component in relatively high concentrations is recovered continuously. Therefore, at least four adsorption columns are required for this embodiment. If necessary or desired, the same step may be conducted in different columns at the same time.

For carrying out the process of this invention continuously, at least one valve is provided in each conduit connecting the adsorption column to the manifolds. Each of the valves is automatically opened and shut in a predetermined sequence, so that the steps of the operation are consecutively repeated.

EXAMPLE

Using an apparatus the represented in the flowsheet appearing in FIG. 2, columns 1, 2, 3 and 4 were packed with synthetic zeolite A (Union Carbide Co., 1/16 inch $\phi$, 1.5 kg per each column). Pre-treated air, substantially free of both moisture and carbon dioxide, was continuously fed through gas mixture manifold 25 so that the pressure of the column which was in adsorption step reached 4 kg/cm$^2$ abs. for 2 minutes. The purge step was conducted by passing a portion of combined gas through the purge gas manifold 26 at a flow rate of 660 l/hr and a constant pressure of 4 kg/cm$^2$ abs. The first desorption step was conducted by pressure reduction from 4 kg/cm$^2$ abs to atmospheric pressure and the first desorbed gas was withdrawn through first desorbed gas manifold 28. The second desorption step was carried out by reducing the pressure from atmospheric to 230 torr by appropriate control of vacuum compressor 30. The time for the second desorption step was also 2 minutes. The second desorbed gas thus obtained, the pressure of which was atmospheric, was combined with the first desorbed gas, the pressure of which was also atmospheric, at the outlet of pressure control valve 29. Fluctuation of the flowrate of the second desorbed gas was compensated for by adjustng the flow rate of the first desorbed gas with the use of pressure control valve 29, so that the combined gas was recovered at a constant rate and pressure.

The operation steps (comprising adsorption, purge, first desorption and second desorption) were consecutively repeated every 2 minutes. Thus, product gas was continuously collected at a pressure of 4 kg/cm$^2$ and at a flow rate of 260 l/hr. The concentration of nitrogen in the product gas was between 99.85 and 99.92%.

Although this invention has been described with reference to separation of nitrogen and oxygen from air, it is applicable for separation of wide varieties of gaseous components from gas mixtures, provided a selective adsorption medium is available and effective.

It will be appreciated, further, that the concept of this invention may be carried into effect with the use of a wide variety of flow and sequence arrangements which differ from those selected for illustration and description herein.

All such variations and others, including the substitution of equivalent components and steps, the use of certain features independently of other features, and reversals of parts or sequences are within the spirit and scope of this invention as defined in the appended claims.

What is claimed is:

1. In a process for separating a selectively adsorbable gas component from a gas mixture by means of pressure swing adsorption technique which includes an adsorption step accompanied by pressure elevation and a desorption step accompanied by pressure reduction, in which adsorption columns are used which are packed with an adsorbent having capacity to adsorb said selectively adsorbable gas component, the improvement comprising:
   a. performing said desorption step in a first desorption step and a second desorption step separately in at least three adsorption columns simultaneously;
   b. recovering a first desorbed gas by pressure reduction from a region of relatively high pressure to a region of intermediate pressure;
   c. recovering a second desorbed gas from said desorption step by pressure reduction from a region of said intermediate pressure to a region of relative low pressure;
   d. combining said second desorbed gas with a portion or all of said first desorbed gas to produce a combined gas; and
   e. gradually increasing the flow rate of a portion or all of said first desorbed gas prior to being combined with said second desorbed gas whose flow rate is substantially uncontrolled and gradually decreased with pressure reduction so that said combined gas is caused to flow at a substantially constant rate.

2. The process according to claim 1, wherein prior to said first desorption step, purge gas enriched with said selectively adsorbable gas component is introduced into an adsorption column in which an adsorption step has been completed and an effluent gas is discharged from said adsorption column.

3. The process according to claim 2, wherein a part of said combined gas is collected as a product gas and another part is used as said purge gas.

4. The process according to claim 2, wherein a part of said first desorbed gas is collected as product gas and another part of said first desorbed gas is combined with said second desorbed gas and used as said purge gas.

5. The process according to claim 2, wherein an initial pressure of said first desorption step and a pressure of said purge step are provided which are higher than atmospheric pressure, and a final pressure of said second desorption step is provided which is about equal to or lower than atmospheric pressure.

6. The process according to claim 2, wherein all or a portion of said combined gas is compressed up to substantially the purge gas pressure.

7. The process according to claim 2, wherein an end pressure of said adsorption step, a pressure of said purge step and an initial pressure of said first desorption step lie between 0.5 and 7 kg/cm² gauge, a final pressure of said second desorption step lies between 50 and 700 torr and said intermediate pressure lies between 500 torr and 2 kg/cm² gauge.

8. The process according to claim 1, wherein an initial pressure of said first desorption step is provided which is higher than atmospheric pressure and a final pressure of said second desorption step is provided which is about equal to or lower than atmospheric pressure.

9. The process according to claim 1, wherein said second desorbed gas is compressed to said intermediate pressure prior to being combined with all or a portion of said first desorbed gas.

10. The process according to claim 1, wherein said gas mixture is air and said selectively adsorbable gas component is nitrogen.

11. The process according to claim 10, wherein said adsorbent is a zeolite.

12. The process according to claim 11, wherein said zeolite is selected from the group consisting of synthetic and natural zeolites of the group consisting of zeolite A, zeolite X, zeolite Y, mordenite and clinoptirolite.

13. The process according to claim 10, wherein said air is previously pre-treated to remove moisture and/or carbon dioxide therefrom.

14. The process according to claim 13, wherein said pre-treatment is conducted in containers containing an adsorbent which adsorbs said moisture and/or carbon dioxide, in which, treated air is withdrawn in a removal step substantially free of moisture and/or carbon dioxide from one of said containers, and further regenerating, in a container in which said removal step has finished, by introducing a desorbent gas, and wherein both said removal and regeneration steps are consecutively repeated.

15. The process according to claim 14, wherein the pressure of said removal step lies between 1 and 7 kg/cm² gauge and that of said regeneration step is about equal to atmospheric pressure.

16. The process according to claim 14, wherein said desorbent gas is said effluent gas of said purge step.

* * * * *